United States Patent
Bach et al.

(10) Patent No.: US 6,877,597 B2
(45) Date of Patent: Apr. 12, 2005

(54) CLUTCH MECHANISM

(75) Inventors: David F. Bach, Rockford, MI (US); James W. Bach, Gowen, MI (US)

(73) Assignee: Grand Rapids Controls, Inc., Rockford, MI (US)

( * ) Notice: Subject to any disclaimer, the term of this patent is extended or adjusted under 35 U.S.C. 154(b) by 0 days.

(21) Appl. No.: 10/368,889

(22) Filed: Feb. 18, 2003

(65) Prior Publication Data

US 2004/0159525 A1 Aug. 19, 2004

(51) Int. Cl.[7] .............................................. F16D 67/02
(52) U.S. Cl. ................. 192/223.4; 192/41 S; 192/81 C
(58) Field of Search ........................... 192/223.4, 41 S, 192/81 C

(56) References Cited

U.S. PATENT DOCUMENTS

| | | |
|---|---|---|
| 1,965,878 A | 7/1934 | Briggs |
| 1,997,646 A | 4/1935 | Miller |
| 2,145,666 A | 1/1939 | Roethel |
| 2,458,441 A | 1/1949 | Starkey |
| 2,946,417 A | 7/1960 | Hungerford, Jr. |
| 3,110,380 A | 11/1963 | Meyer et al. |
| 3,393,777 A | 7/1968 | Sacchini |
| 3,726,370 A | 4/1973 | Hubbard, Jr. |
| 3,817,473 A * | 6/1974 | Board et al. ............. 242/381.1 |
| 3,926,385 A * | 12/1975 | Board et al. ............. 242/381.4 |
| 4,614,257 A | 9/1986 | Harada et al. |
| 4,651,854 A | 3/1987 | Harada |
| 4,682,789 A * | 7/1987 | Higuchi et al. .......... 280/801.1 |
| 4,778,138 A | 10/1988 | Yamada |
| 4,926,987 A | 5/1990 | Honma |
| 4,953,676 A | 9/1990 | Yamada et al. |
| 5,109,963 A | 5/1992 | Husted et al. |
| 5,681,005 A | 10/1997 | Ligon, Sr. et al. |
| 5,836,110 A | 11/1998 | Buening |
| 5,842,659 A | 12/1998 | Ligon, Sr. et al. |
| 5,909,791 A | 6/1999 | DiStefano |
| 6,095,312 A | 8/2000 | Schumann |
| 6,125,851 A | 10/2000 | Walker et al. |
| 6,158,563 A * | 12/2000 | Welfonder et al. ....... 192/223.3 |
| 6,164,428 A * | 12/2000 | Berman et al. .......... 192/223.4 |
| 6,209,960 B1 | 4/2001 | Bradbury |
| 2003/0178276 A1 * | 9/2003 | Fraczek et al. ............ 192/3.52 |

* cited by examiner

*Primary Examiner*—Saul Rodriguez
(74) *Attorney, Agent, or Firm*—Quinn Law Group, PLLC; Christopher W. Quinn

(57) ABSTRACT

A clutch mechanism for seating units of the type having an adjustable support member. The clutch mechanism includes a housing having first and second opposite ends, and a generally cylindrical inner sidewall. A clamp member is movably interconnected with the housing, and the clamp member is adapted to secure the housing to a frame member of a seating unit. A rotor is rotatably mounted within the housing, and the rotor has a generally cylindrical outer surface. The rotor defines an axis of rotation, and has a channel with opposed sidewalls in the cylindrical outer surface extending generally parallel to the axis. A handle extends from the rotor, and a pulley is rotatably interconnected with the rotor. The pulley has an annular groove and an extension disposed in the channel of the rotor. The pulley is adapted to be operably coupled to an adjustable support member of a seating unit to provide adjustment of the support member. A coil spring is disposed around the rotor, and has opposite ends disposed in the channel adjacent the opposed sidewalls with the extension of the pulley position between the opposite ends. The coil spring frictionally engages the cylindrical inner sidewall and prevents rotation of the pulley relative to the housing when a rotational force is applied to the pulley. The sidewalls of the channel of the rotor engage the opposite ends of the coil spring and generate tension on the coil spring in a manner tending to reduce friction between the coil spring and the housing to permit rotation of the rotor and pulley relative to the housing when a force is applied to the handle.

11 Claims, 3 Drawing Sheets

CLUTCH MECHANISM

BACKGROUND OF THE INVENTION

Seating for offices, automobiles, and the like commonly include adjustable supports in the seat back and/or seat itself. Various mechanisms have been developed to facilitate adjustment of the various seat components. However, known adjustment mechanisms may be quite costly to manufacture, and may not provide the desired ease of use and range of adjustment.

SUMMARY OF THE INVENTION

One aspect of the present invention is a clutch mechanism for seating units of the type having an adjustable support member. The clutch mechanism includes a housing having first and second opposite ends, and a generally cylindrical inner sidewall. A clamp member is movably interconnected with the housing, and the clamp member is adapted to secure the housing to a frame member of a seating unit. A rotor is rotatably mounted within the housing, and the rotor has a generally cylindrical outer surface. The rotor defines an axis of rotation, and has a channel with opposed sidewalls in the cylindrical outer surface extending generally parallel to the axis. A handle extends from the rotor, and a pulley is rotatably interconnected with the rotor. The pulley has an annular groove and an extension disposed in the channel of the rotor. The pulley is adapted to be operably coupled to an adjustable support member of a seating unit to provide adjustment of the support member. A coil spring is disposed around the rotor, and has opposite ends disposed in the channel adjacent the opposed sidewalls with the extension of the pulley position between the opposite ends. The coil spring frictionally engages the cylindrical inner sidewall and prevents rotation of the pulley relative to the housing when a rotational force is applied to the pulley. The sidewalls of the channel of the rotor engage the opposite ends of the coil spring and generate tension on the coil spring in a manner tending to reduce friction between the coil spring and the housing to permit rotation of the rotor and pulley relative to the housing when a force is applied to the handle.

Another aspect of the present invention is a seating unit including a seat and a back. At least one of the seat and the back has a movable portion. The seating unit includes a clutch mechanism. The clutch mechanism includes a housing having a cavity defining inner sidewalls, and the clutch mechanism also includes a pulley rotatably interconnected with the housing, and a rotor rotatably interconnected with a pulley. The rotor defines a longitudinally extending slot. The clutch mechanism includes a handle connected to the rotor to permit manual rotation of the rotor. A coil spring is wrapped around the rotor, and has opposite ends extending into the longitudinally extending slot. The pulley includes an extension disposed in the longitudinally extending slot. At least a portion of the extension is disposed between the opposite ends of the coil spring. A flexible line is wrapped around at least a portion of the pulley, and the flexible line is operably connected with the movable portion of the seating unit to provide adjustment thereof upon movement of the handle by a user.

Yet another aspect of the present invention is a clutch mechanism including a housing having an inner sidewall and a clamp member movably interconnected with the housing. A rotor is rotatably interconnected to the housing. The rotor has an outer surface and defines an axis of rotation. The rotor has a channel extending generally parallel to the axis of rotation. A handle is secured to the rotor, and a pulley is rotatably interconnected with the rotor. The pulley has an annular groove, and also includes an extension disposed in the channel of the rotor. A coil spring is disposed around the rotor, and has opposite ends disposed in the channel with the extension of the pulley positioned between the opposite ends of the coil spring. The coil spring frictionally engages the inner sidewall, and prevents rotation of the pulley relative to the housing when a rotational force is applied to the pulley. The channel of the rotor engages the opposite ends of the coil spring and generates tension on the coil spring in a manner tending to reduce friction between the coil spring and the housing to permit rotation of the rotor and pulley relative to the housing when a force is applied to the handle.

These and other features, advantages, and objects of the present invention will be further understood and appreciated by those skilled in the art by reference to the following specification, claims, and appended drawings.

BRIEF DESCRIPTION OF THE DRAWINGS

FIG. 2.

DETAILED DESCRIPTION OF PREFERRED EMBODIMENT

Figure 1:
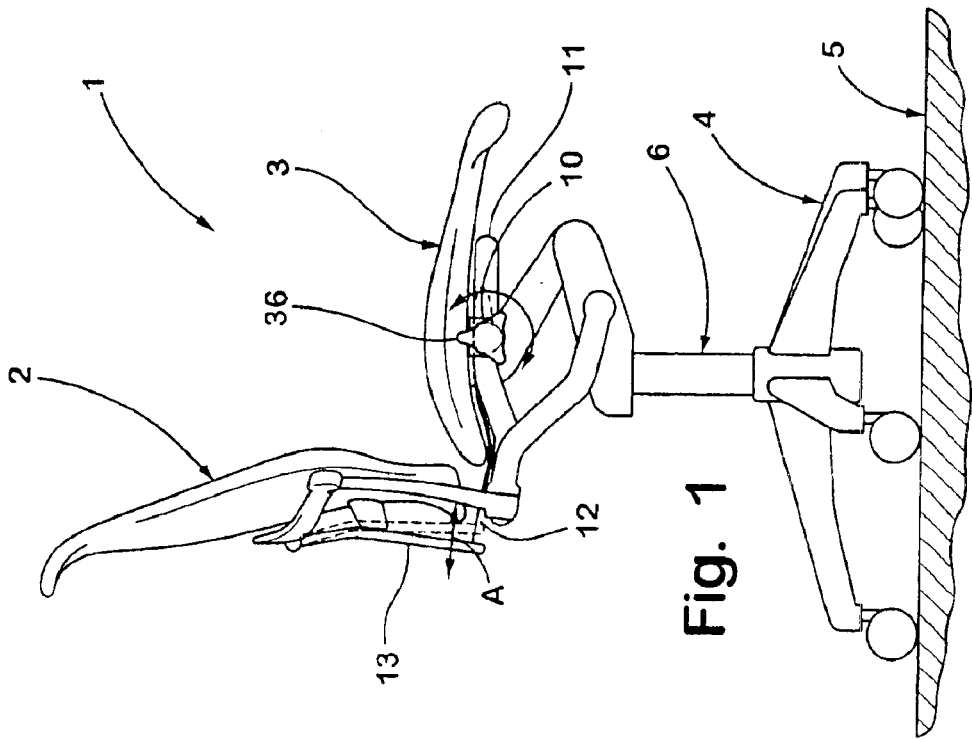
FIG. 1 is a side elevational view illustrating a seating unit having a clutch mechanism according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a seating unit 1 includes a back 2, a seat 3, and a support assembly such as base 4 for supporting the seating unit 1 on a floor 5. In the illustrated example, the seating unit 1 comprises a chair that is particularly suitable for use in office environments and the like. However, the seating unit could also comprise a seat utilized in, for example, automobiles, trucks, or the like. Seating units commonly include adjustable ergonomic supports of various types in the seat back 2 and/or the seat 3 for adjustment to suit a particular user. Height adjustment may also be provided in seating units for vehicles. Seating unit 1 includes a clutch mechanism 10 that is mounted to seat frame 11. Clutch mechanism 10 is operably connected to an adjustable back support 13 by a cable assembly 12. However, clutch mechanism 10 may also be utilized to provide adjustment of an adjustable support member (not shown) in the seat 3, or other adjustable seat component. Seating units designed for use in office environments and the like commonly include a height adjustment such as a pneumatic cylinder or "air spring" 6 illustrated in FIG. 1.

Figure 2:
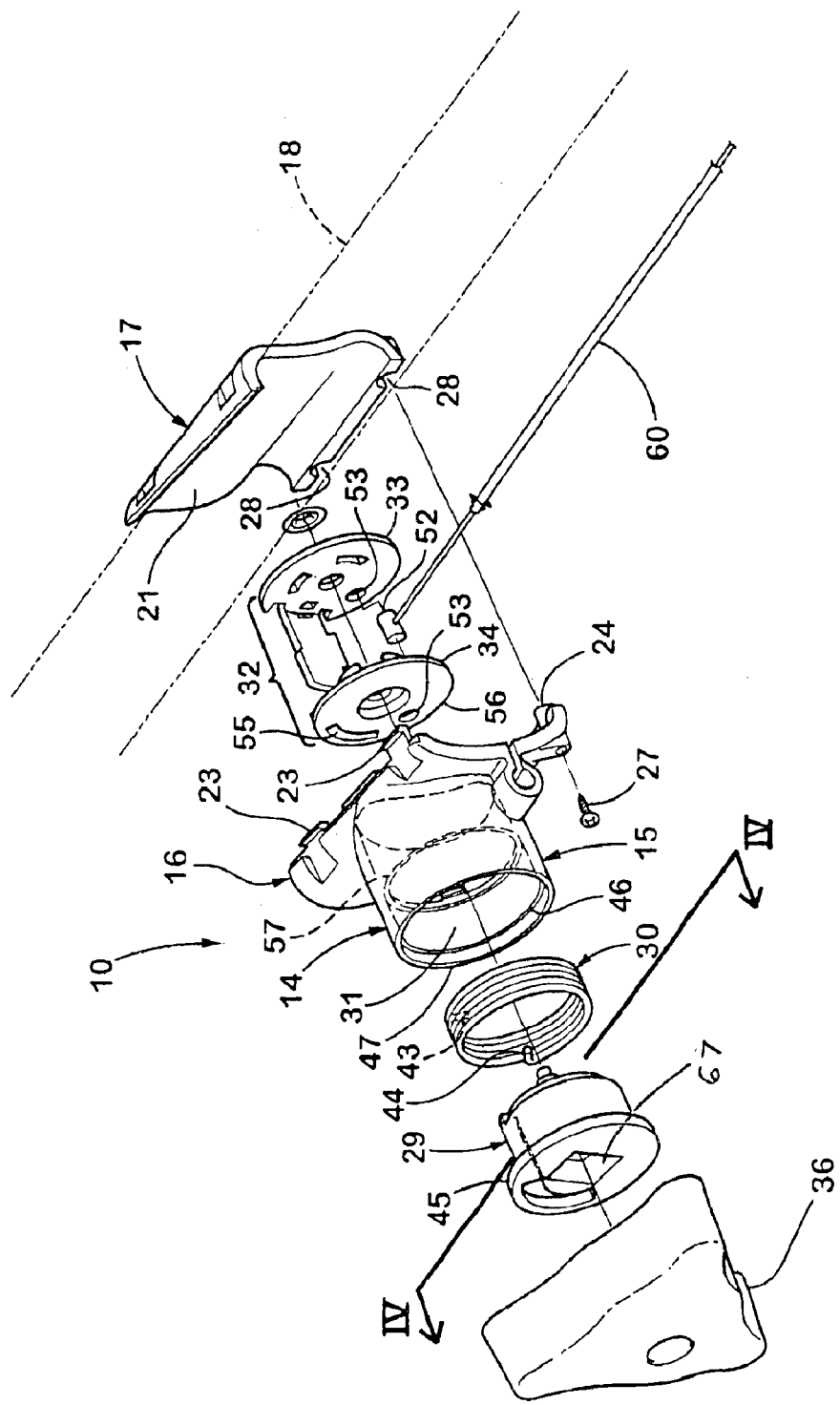
FIG. 2 is a partially fragmentary, exploded perspective view of the clutch mechanism of FIG. 3.
Figures 3A, 3B:
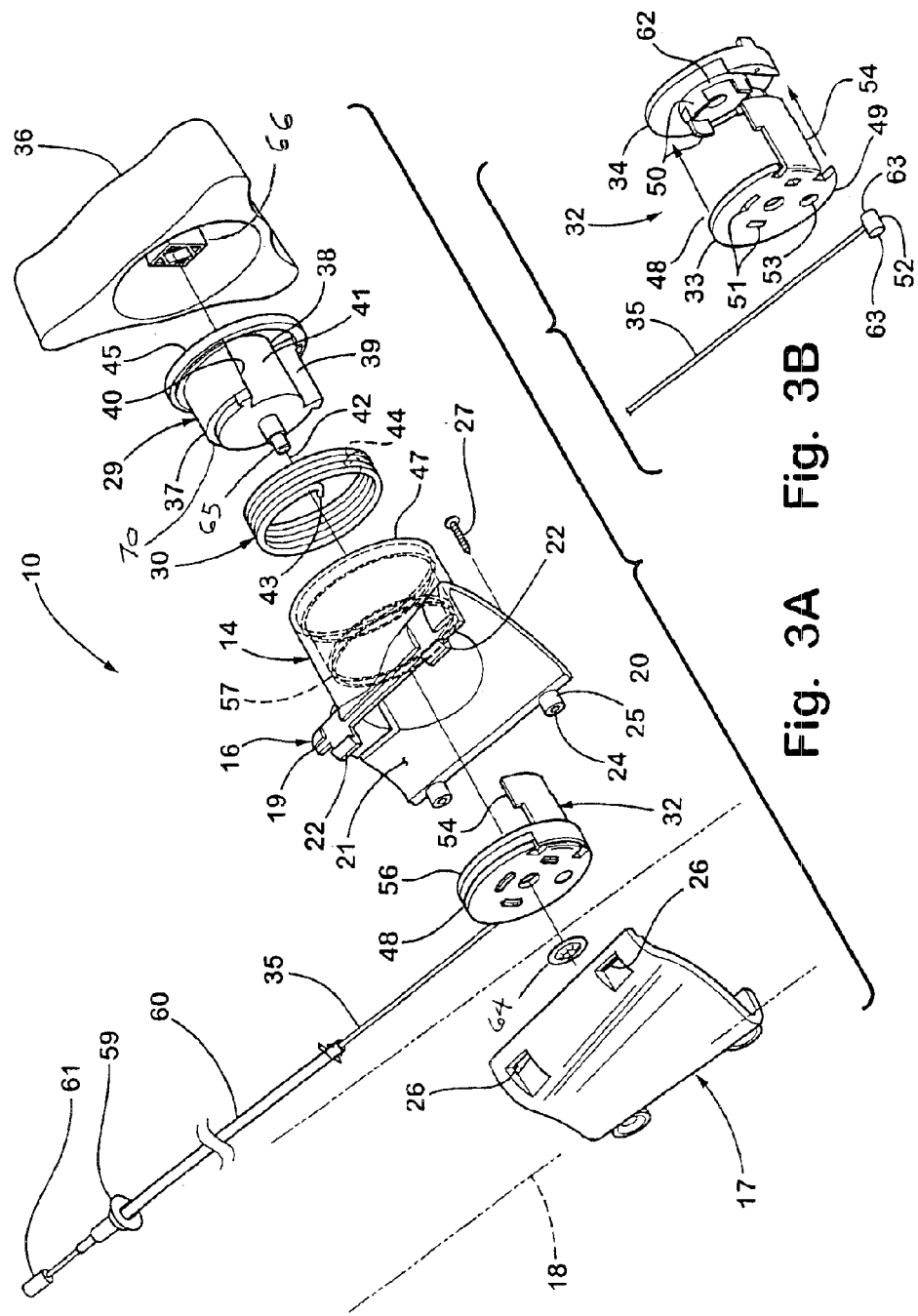
FIG. 3A is a partially fragmentary, exploded perspective view of the clutch mechanism.
FIG. 3B is a partially fragmentary, exploded perspective view of the pulley.

With further reference to FIGS. 2 and 3A, the clutch mechanism 10 includes a housing 14 having a cylindrical body portion 15 and a generally transverse base portion 16.

The base portion 16 interconnects with a clamp member 17 to secure the clutch mechanism 10 to a frame member 18 of the seating unit frame 11. The base portion 16 of housing 14 includes a curved inner surface 21 that fits closely around the frame member 18. Base portion 16 also defines a first end portion 19 including a pair of extensions 22, each of which includes a barbed end 23. The second end portion 20 includes a pair of bosses 25 through which openings 24 extend. During attachment of the clutch mechanism 10 to the frame member 18, barbed ends 23 of extensions 22 are first inserted into rectangular openings 26 of clamp member 17. With the frame member 18 positioned between the housing 14 and clamp member 17. Self-tapping screws 27 are then inserted through openings 24 in housing 14 and into openings 28 in clamp member 17. As the screws 27 are tightened, threads are formed in openings 28, and the housing 14 and clamp member 17 pivot about extensions 22 to thereby clamp the clutch mechanism 10 to the frame member 18. This arrangement permits the clutch mechanism 10 to be retrofitted to existing seating units such as the office chair illustrated in FIG. 1.

Clutch mechanism 10 includes a rotor 29 and coil spring 30 that are rotatably disposed within the cylindrical cavity 31 of housing 14 when assembled. In the illustrated example, a pulley 32 includes a pulley plate 33 and pulley member 34 that, when assembled (FIG. 3A), are rotatably disposed at least partially within the housing 14, and form an annular groove 48 around peripheral edge 49 of pulley 32. A cable 35 is received in groove 48, and wraps at least partially around the pulley 32. Pulley plate 33 includes a pluirality of slots 51 that receive tabs 50 of pulley member 34 to position and align the pulley plate 33 with the pulley member 34, and cylindrical surface 62 of pulley member 34 forms the inner surface of groove 48. A retainer 64 is received on spindle 65 of rotor 29 to interconnect pulley 32 and rotor 29. Cable 35 includes a small cylindrically shaped connector 52 at the end thereof. Opposite ends 63 of connector 52 are received in openings 53 in pulley plate 33 and pulley member 34 to thereby secure the cable 35 to the pulley 32. The pulley plate 33 includes an extension 54 that extends through an opening 55 in pulley member 34 when assembled. As described in more detail below, in use, extension 54 transmits forces from cable 35 to housing 14 or rotor 29. The pulley member 34 is preferably made of a polymer material, and the pulley plate 33 is preferably made of a metal material to ensure that the pulley assembly 32 provides sufficient strength when a load is applied to the cable 35 and/or handle 36. A sheath 60 preferably extends around the cable 35, and a fitting 59 provides an attachment point to secure the end 61 of cable 35 to the adjustable back support member 13. Cable 35 operably interconnects the clutch mechanism 10 to an adjustable member of a seating unit or other such component. A handle 36 includes an extension 66 having a square cross-sectional shape that is closely received in square recess 67 of rotor 29 to interconnect handle 36 and rotor 29, such that rotation of the handle 36 by a user rotates the rotor 29. Rotor 29 includes a cylindrical outer surface portion 37 and a reduced radius cylindrical surface 38. The reduced cylindrical surface 38 and sidewall surfaces 39 and 40 together form a channel 41 that extends generally parallel to the axis of rotation 42 of the rotor 29. Coil spring 30 includes opposite end portions 43 and 44 that extend radially inwardly. When assembled, the coil spring 30 fits closely around the cylindrical outer surface 37 of rotor 29, and end portions 43 and 44 of coil spring 30 are disposed within channel 41. Rotor 29 includes a peripheral lip 45. When assembled, the lip portion 45 of rotor 29 slidably engages an annular edge 46 (FIG. 2) extending around the cylindrical cavity 31 of housing 14 adjacent a first end 47 of the housing 14.

Figure 4:
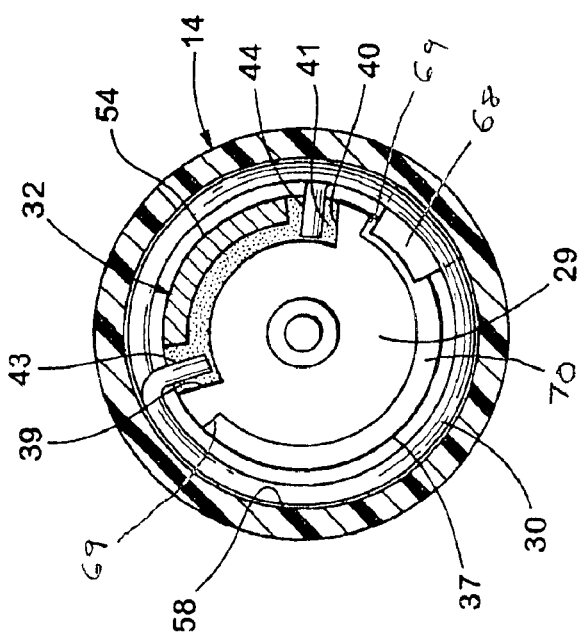
FIG. 4 is a cross-sectional view of the clutch mechanism taken along the line IV—IV.

When the clutch mechanism 10 is assembled, the extension 54 of pulley 32 is positioned in the channel 41 of rotor 29, and the edge portion 56 of pulley 32 is audibly supported on an annular edge 57 extending around the cylindrical cavity 31 of housing 14. With further reference to FIG. 4, housing 14 includes a tab or stop 68 that extends inwardly adjacent annular edge portion 70 of rotor 29. Stop surfaces 69 on rotor 29 contact stop 68 to limit rotation of rotor 29 to about 180° relative to housing 14. Coil spring 30 fits closely against the cylindrical inner surface 58 of housing 14, and the end portions 43 and 44 of coil spring 30 extend into the channel 41 of rotor 29. Extension 54 is disposed between the end portions 43 and of coil spring 30. In use, if a load is applied to the cable 35 tending to rotate the pulley 32, but no external force is applied to the handle 36, the extension 54 of pulley 32 will tend to rotate and contact either the first end portion 43 or second end portion 44 of coil spring 30, depending upon the direction the force is acting. For example, if a clockwise force (FIG. 4) is applied to the pulley 32, the extension 54 will contact second end 44 of spring 30. Because the force on coil spring 30 is a compression force, the coil spring 30 will tend to expand outwardly against the inner side surface 58 of housing 14, thereby resulting in increased friction between the spring 30 and housing 14. The friction between the coil spring 30 and housing 14 prevents rotation of the pulley 32 because the forces applied to pulley 32 result in greater friction between coil spring 30 and housing 14, thereby "locking" the pulley 32 relative to housing 14. Alternately, if a force is applied to the cable 35 tending to rotate the pulley 32 in a direction that is counter-clockwise (FIG. 4), the extension 54 will contact the first end 43 of coil spring 30, thereby causing an increase in friction between coil spring 30 and housing 14 as described above. Thus, rotational forces applied to pulley 32 are transmitted through the coil spring 30 into the housing 14, and to the frame member 18.

As discussed above, handle 36 is fixed to rotor 29. During operation, rotation of the handle 36 by a user will cause the coil spring 30 to release, permitting rotor 29 to rotate, thereby rotating pulley 32. For example, if a clockwise force (FIG. 4) is applied to handle 36, the sidewall 39 of channel 41 in rotor 29 will contact the end portion 43 of coil spring 30. This force tends to place the coil spring 30 in tension, such that the outer diameter of the coil spring 30 tends to be reduced. This, in turn, reduces the friction between the coil spring 30 and the housing 14, such that a user can rotate the handle 36 and rotor 29. As the rotor 29 is rotated, the extension 54 contacts the end portion 43 of coil spring 30, such that the forces applied to the rotor 29 are transmitted to the extension 54 and pulley 32. As the rotor 29 is rotated, the pulley 32 is also thereby rotated, such that the amount of cable 35 wrapped about the pulley 32 can be adjusted by the user. If a counter-clockwise force (FIG. 4) is applied by a user, the sidewall 40 of rotor 29 will contact end 44 of coil spring 30, releasing coil spring 30, and rotating pulley 32 in substantially the same manner as just described. Thus, clutch mechanism 10 permits adjustment when a force is applied to handle 36 by a user, but prevents movement that would otherwise occur due to application of a force to cable 35 resulting from a force applied to an adjustable support member 13.

The clutch mechanism of the present invention provides a cost-effective, reliable mechanism for adjusting components of a seating unit or other components. The clamp arrangement permits the clutch mechanism to be easily retrofitted to existing seating units. Although the clutch mechanism has been described in connection with seating units such as office chairs, automotive seats or the like, the clutch mechanism may also be utilized to provide adjustment for a wide variety of mechanisms.

In the foregoing description, it will be readily appreciated by those skilled in the art that modifications may be made to

What is claimed is:

1. A clutch mechanism for as eating unit of the type having a seat and seat frame and an adjustable support member spaced from the seat, comprising:

a housing mounted with respect to said seat frame and having first and second opposite ends and a generally cylindrical inner sidewall;

a clamp member movably interconnected with said housing, said clamp member adapted to secure said housing to a frame member of said seating unit;

a rotor rotatably mounted within said housing, said rotor having a generally cylindrical outer surface, said rotor defining an axis of rotation and having a channel having opposed sidewalls in said cylindrical outer surface extending generally parallel to said axis;

a handle extending from said rotor;

a pulley rotatably interconnected with said rotor, said pulley having an extension disposed in said channel of said rotor, said pulley being operably coupled to said adjustable support member of said seating unit to provide adjustment of said adjustable support member by said handle;

a flexible line having an end secured to said pulley, said housing having an opening therethrough, said line extending through said opening to said adjustable support member spaced from said seat for interconnection of said clutch mechanism with said adjustable support member; and a coil spring disposed around said rotor and having opposite ends disposed in said channel adjacent said opposed sidewalls with said extension of said pulley positioned between said opposite ends, said coil spring frictionally engaging said cylindrical inner sidewall and preventing rotation of said pulley relative to said housing when one rotational force is applied to said pulley by said flexible line attached at one end to said adjustable support member, said sidewalls of said channel of said rotor engaging said opposite ends of said coil spring and generating tension on said coil spring in a manner tending to reduce friction between said coil spring and said housing to permit rotation of said rotor and said pulley relative to said housing when another rotational force is applied to said rotor by said handle.

2. The clutch mechanism of claim 1, wherein:

said clamp member defines first and second ends, said first end of said clamp member pivotably interconnected with said housing.

3. The clutch mechanism of claim 2, including:

a threaded member engaging said second end of said clamp member and said housing to generate a clamping force.

4. The clutch mechanism of claim 1, wherein:

said housing includes an annular lip portion adjacent said cylindrical inner sidewall;

said rotor slidably supported by said annular lip portion.

5. The clutch mechanism of claim 4, wherein:

said cylindrical inner sidewall comprises a first inner sidewall, said housing including a second inner sidewall adjacent said annular lip portion having a diameter greater than that of said first inner sidewall, said rotor having a peripheral edge disposed adjacent said second inner sidewall.

6. A clutch mechanism, comprising:

a housing having an inner sidewall;

a clamp member movably interconnected with said housing;

a rotor rotatably interconnected to said housing, said rotor having an outer surface and defining an axis of rotation, said rotor having a channel extending generally parallel to said axis of rotation;

a handle secured to said rotor;

a pulley rotatably interconnected with said rotor, said pulley having an extension disposed in said channel of said rotor;

a flexible line having an end secured to said pulley, said housing having an opening, said line extending through said opening to an adjustable member mounted remotely from said clutch mechanism; and a coil spring disposed around said rotor and having opposite ends disposed in said channel with said extension of said pulley positioned between said opposite ends, said coil spring frictionally engaging said inner sidewall and preventing rotation of said pulley relative to said housing when one rotational force is applied to said pulley by said flexible line, said channel of said rotor engaging said opposite ends of said coil spring and generating tension on said coil spring in a manner tending to reduce friction between said coil spring and said housing to permit rotation of said rotor and pulley relative to said housing when another rotational force is applied to said handle.

7. The clutch mechanism of claim 6, wherein:

said clamp member defines first and second ends, said first end of said clamp member pivotably interconnected with said housing.

8. The clutch mechanism of claim 7, including:

a threaded member engaging said second end of said clamp member and said housing to generate a clamping force.

9. The clutch mechanism of claim 6, wherein:

said inner sidewall of said housing is cylindrical, said housing including an annular lip portion adjacent said cylindrical inner sidewall;

said rotor slidably supported by said annular lip portion.

10. The clutch mechanism of claim 9, wherein:

said cylindrical inner sidewall comprises a first inner sidewall, said housing including a second inner sidewall adjacent said annular lip portion having a diameter greater than that of said first inner sidewall, said rotor having a peripheral edge disposed adjacent said second inner sidewall.

11. The clutch mechanism of claim 6, wherein:

said handle includes three extensions extending radially outwardly perpendicular to said axis of rotation.

* * * * *